United States Patent
Zidar

(10) Patent No.: US 9,708,692 B2
(45) Date of Patent: Jul. 18, 2017

(54) SLIDING BEARING

(75) Inventor: Jakob Zidar, Altmuenster (AT)

(73) Assignees: Miba Gleitlager Austria GmbH, Laakirchen (AT); KS Gleitlager GmbH, St. Leon-Rot (DE)

( * ) Notice: Subject to any disclaimer, the term of this patent is extended or adjusted under 35 U.S.C. 154(b) by 1325 days.

(21) Appl. No.: 12/736,409

(22) PCT Filed: Apr. 7, 2009

(86) PCT No.: PCT/AT2009/000137
§ 371 (c)(1),
(2), (4) Date: Oct. 6, 2010

(87) PCT Pub. No.: WO2009/124331
PCT Pub. Date: Oct. 15, 2009

(65) Prior Publication Data
US 2011/0034354 A1 Feb. 10, 2011

(30) Foreign Application Priority Data
Apr. 7, 2008 (AT) .................................. A 547/2008

(51) Int. Cl.
*F16C 33/20* (2006.01)
*F16C 33/04* (2006.01)
(Continued)

(52) U.S. Cl.
CPC ............... *C22C 5/06* (2013.01); *C22C 5/08* (2013.01); *F16C 33/121* (2013.01); *F16C 33/122* (2013.01)

(58) Field of Classification Search
CPC ................... C22C 5/06; C10M 7/00
(Continued)

(56) References Cited

U.S. PATENT DOCUMENTS

| | | |
|---|---|---|
| 605,593 A | 6/1898 | Bates |
| 2,473,059 A | 6/1949 | Hunsicker et al. |

(Continued)

FOREIGN PATENT DOCUMENTS

| | | |
|---|---|---|
| AT | 502 506 | 4/2007 |
| CN | 1975188 A | 6/2007 |

(Continued)

OTHER PUBLICATIONS

International Search Report.
(Continued)

*Primary Examiner* — Prem C Singh
*Assistant Examiner* — Francis C Campanell
(74) *Attorney, Agent, or Firm* — Collard & Roe, P.C.

(57) ABSTRACT

The invention relates to a sliding bearing (1) comprising a support element (2) on which at least one additional functional layer (3) is arranged which consists of a silver-based alloy with silver as the main constituent of the alloy. The functional layer (3) contains, in addition to silver, at least one element from a group including gallium, manganese, nickel, copper, zinc, germanium, indium, tin, antimony and aluminum, wherein the total content of said elements is between 0.01 wt. % and 70 wt. % and the remainder is formed by silver containing production-related impurities, with the proviso that the proportion of each of the elements gallium, manganese, nickel, zinc, germanium and antimony in the binary silver-based alloys is a maximum of 49 wt. %, the proportion of indium being not more than 10 wt. %, the proportion of tin or copper content in the functional layer embodied as a sliding being not more than 10 wt. % and 14 wt. % respectively.

13 Claims, 1 Drawing Sheet

(51) Int. Cl.
*F16C 33/10* (2006.01)
*F16C 19/00* (2006.01)
*C22C 5/06* (2006.01)
*C22C 5/08* (2006.01)
*F16C 33/12* (2006.01)

(58) Field of Classification Search
USPC .................................. 508/100, 108; 384/13
See application file for complete search history.

(56) References Cited

U.S. PATENT DOCUMENTS

| | | | |
|---|---|---|---|
| 3,745,325 | A | 7/1973 | Harvey |
| 3,811,876 | A | 5/1974 | Harigaya et al. |
| 4,978,587 | A * | 12/1990 | Mori et al. .................... 428/645 |
| 5,045,405 | A | 9/1991 | Koroschetz et al. |
| 5,911,513 | A | 6/1999 | Tsuji et al. |
| 6,235,405 | B1 | 5/2001 | Rumpf |
| 6,354,919 | B2 | 3/2002 | Chopra |
| 6,841,012 | B2 * | 1/2005 | Croce .......................... 148/430 |
| 7,368,046 | B2 | 5/2008 | Adam et al. |
| 7,572,521 | B2 | 8/2009 | Mergen et al. |
| 7,575,814 | B2 | 8/2009 | Adam et al. |
| 2002/0026855 | A1 | 3/2002 | Sakai et al. |
| 2002/0162751 | A1 | 11/2002 | Santini |
| 2003/0081868 | A1 * | 5/2003 | Law .............................. 384/276 |
| 2005/0003225 | A1 | 1/2005 | Gartner |
| 2006/0099443 | A1 | 5/2006 | Nakashima et al. |
| 2007/0065067 | A1 | 3/2007 | Gartner et al. |
| 2007/0230845 | A1 * | 10/2007 | Rumpf ......................... 384/276 |
| 2008/0159671 | A1 * | 7/2008 | Leonardelli .................. 384/129 |

FOREIGN PATENT DOCUMENTS

| | | |
|---|---|---|
| EP | 0 908 539 | 4/1999 |
| EP | 1 264 986 | 12/2002 |
| EP | 1 306 569 | 5/2003 |
| EP | 1 624 081 | 2/2006 |
| GB | 544153 | 3/1942 |
| GB | 2 337 306 | 11/1999 |
| JP | 48-029451 | 9/1973 |
| JP | 62-292890 | 12/1987 |
| JP | 4-202640 | 7/1992 |
| JP | 11-050296 | 2/1999 |
| JP | 11-257355 | 9/1999 |
| JP | 11-269580 | 10/1999 |
| JP | 2002-060869 | 2/2002 |
| JP | 2003-322152 | 11/2003 |
| JP | 2004-307960 | 11/2004 |
| JP | 2007-032758 | 2/2007 |
| JP | 2007-064426 | 3/2007 |
| WO | WO 89/01094 | 2/1989 |
| WO | WO 2005/015036 | 2/2005 |
| WO | WO 2005/015037 | 2/2005 |
| WO | WO 2008/074345 | 6/2008 |

OTHER PUBLICATIONS

"Neue Lagermaterialien mit guten Trockenlaufeigenschaften" ("New bearing materials with good dry running properties"), Dr. H. B. Hintermann, Schweizer Archiv, vol. 38, Feb. 1972, pp. 51-59. (Spec., pp. 2-3).

"Tribological Properties of Environmentally Friendly Three-Layer Engine Bearings," A. Norito et al., Int. J. of Applied Mechanics and Engineering, 2002, vol. 7, special issue, SITC 2002, pp. 263-268. (Spec., p. 3).

* cited by examiner

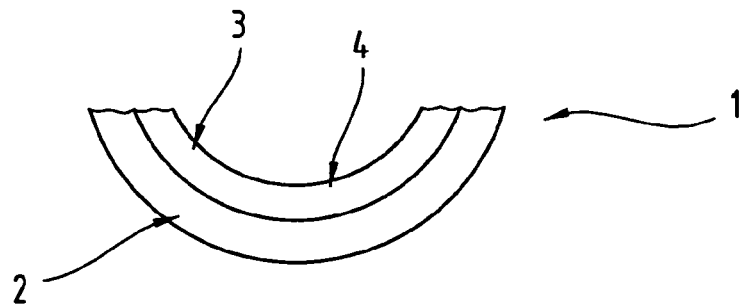
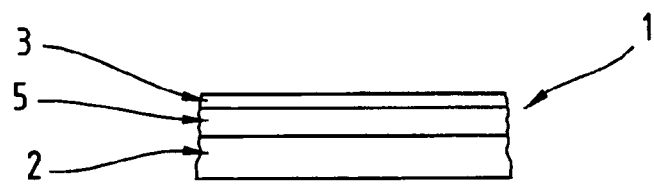
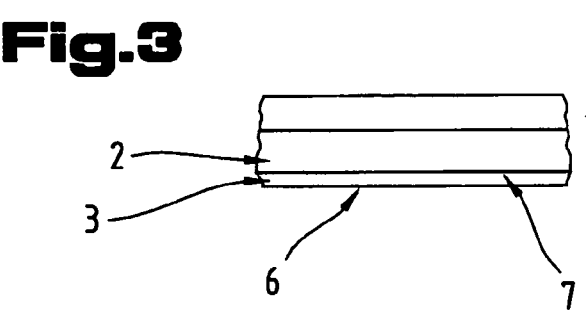
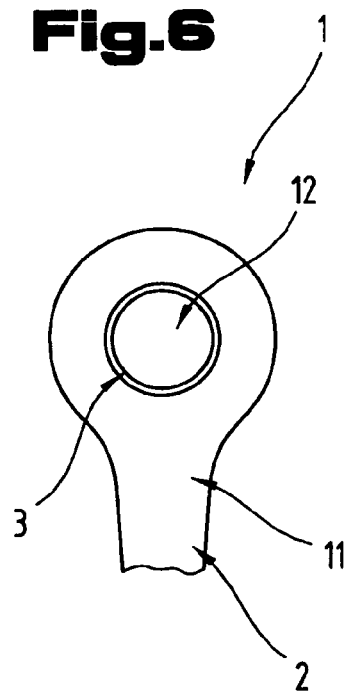
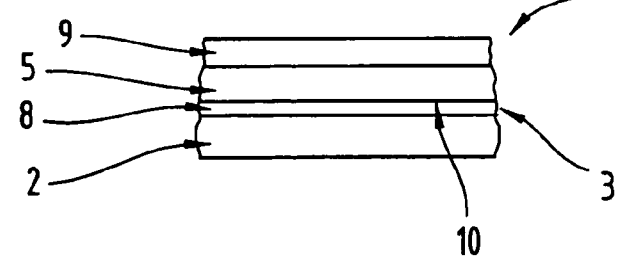
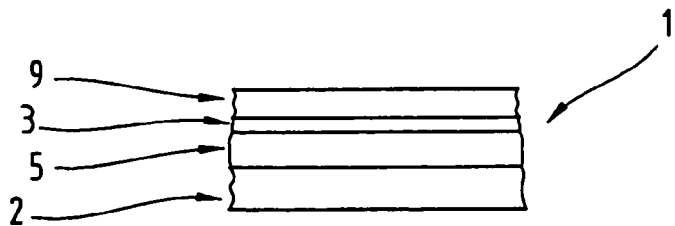

SLIDING BEARING

CROSS REFERENCE TO RELATED APPLICATIONS

This application is the National Stage of PCT/AT2009/000137 filed on Apr. 7, 2009, which claims priority under 35 U.S.C. §119 of Austrian Application No. A 547/2008 filed on Apr. 7, 2008, the disclosure of which is incorporated by reference. The international application under PCT article 21(2) was not published in English.

The invention relates to a sliding bearing, comprising a support element, on which at least one additional functional layer is arranged, which consists of a silver-based alloy with silver as the main alloy component, wherein if necessary between the functional layer and the support element or on top of the functional layer at least one additional layer is arranged.

The use of silver or alloys with silver as functional layers of bearings is already known from the prior art.

Thus EP 1 306 569 A2 describes a journal with a bushing, which is coated on the outside with a copper-based alloy, which contains between 15 and 90 wt. % silver.

From US 2002/0026855 A1 a two-phase sintered sliding layer with a copper alloy phase is known, which can contain up to 40 wt. % silver.

U.S. Pat. No. 5,911,513 A describes a sliding layer based on tin or aluminium with proportions of between 0.1 and 25 wt. % silver.

From AT 502 506 A4 a silver-based sliding layer is known with a proportion of bismuth of between 2 and 49 wt. %.

JP 2007-032758 A describes a sliding layer made from an alloy with 1 to 20 wt. % silver.

From WO 2005/015036 A1 and WO 2005/015037 A1 respectively a bismuth-sliding layer is known with 0 to 20 wt. % silver.

JP 2004-307960 A describes a sliding layer made from a silver-based alloy with 0.05 to 30 wt. % sulphide forming metal particles, which do not form mixed crystals with silver, as well as 0.05 and 30 wt. % hard particles.

From JP 2003-322152 A a silver-based sliding layer is known with DLC as a solid lubricant.

U.S. Pat. No. 6,354,919 B1 describes a lead-free sliding layer made from a tin-based alloy with 2 to 10 wt. % silver.

US 2002/0162751 A1 describes a sliding element with a hard chrome layer, which is coated with a galvanically deposited silver.

From JP 2002-060869 A a sliding layer made from a copper based alloy is known with 2 to 4% silver and 1 to 10% tin. Silver and tin are preferably present as solid solutions in the copper matrix.

According to EP 0 908 539 A2 a copper-based sliding layer can have a proportion of silver of up to a maximum of 20 wt. %.

According to JP 11-050296 A a bismuth-based sliding layer can comprise between 0.5 and 10 wt. % silver.

A sliding layer with 1 to 15 wt. % silver is described in JP 4-202640 A.

From WO 89/01094 A1 a sliding layer is known made from an alloy with silver as the main alloy component, which contains between 15 vol.-% and 40 vol.-% of a soft metal as an insertion layer.

JP 62-292890 A describes a sliding bearing for high-vacuum applications with a silver-gold alloy layer as the sliding layer.

From U.S. Pat. No. 2,473,059 A a bearing with an aluminium base is known, with 5 to 25 wt. % tin, 5 to 12 wt. % silicon and 0.5 to 10 wt. % silver.

U.S. Pat. No. 605,593 A describes a sliding bearing half-shell with a bearing alloy consisting of a copper alloy with 5 to 20 wt. % silver and 30 to 40% lead.

In "Neue Lagermaterialien mit guten Trockenlaufeigenschaften" ("New bearing materials with good dry running properties"), Dr. H. B. Hintermann, Schweizer Archiv, vol. 38, February 1972, pages 51-59, silver-indium-alloys for bearing elements are described, with a proportion of indium of between 10 and 70 wt. %.

Lastly, "Tribological Properties of Environmentally Friendly Three-Layer Engine Bearings", A. Norito, et al., Int. J. of Applied Mechanics and Engineering, 2002, vol. 7, special issue: SITC 2002, pages 263-268, describes coatings based on silver-graphite composite materials.

The problem addressed by the invention is to provide a layer for highly-stressed sliding bearings.

Said problem of the invention is solved by the aforementioned sliding bearing, in which the functional layer in addition to silver contains at least one element from a group comprising gallium, manganese, nickel, copper, zinc, germanium, indium, tin, antimony and aluminium, wherein the total content of these elements is between 0.01 wt. % and 70 wt. % and the remainder is formed by silver which includes impurities from its production process, with the proviso, that in binary silver-based alloys the proportion of each of the elements gallium, manganese, nickel, zinc, germanium, antimony is a maximum of 49 wt. %, the proportion of indium is a maximum of 10 wt. %, the proportion of tin or copper in the embodiment of the functional layer as a sliding layer is a maximum of 10 wt. % or 14 wt. %.

It is an advantage in this case that the functional layer is characterised by having a relatively high degree of hardness. In addition, layers with the composition according to the invention have a much improved resistance to corrosion compared to pure silver or the known silver layers for sliding bearings at least partly owing to their reduced tendency to form silver sulphide with the sulphur-containing compounds of the lubricating oil. In addition to these improved properties by means of the layers according to the invention a considerable economy can be achieved, as by alloying more inexpensive metals the proportion of silver decreases with the same layer thickness. Owing to the hardness the functional layer according to the invention has improved wearing resistance, for example owing to the formation of phosphorus-containing wearing protection layers or reaction layers by the reaction of manganese, zinc or aluminium with phosphorus-containing compounds of the lubricating oil, so that the sliding bearings according to the invention resist greater stress over a longer period. The sulphide formation with alloy elements, such as e.g. manganese, nickel, copper or zinc can also lead to an improvement in the sliding ability. By means of the alloyed metals however not only the hardness of the functional layer can be made available, but in this way also the ductility of said layer can be improved, for example with gallium or indium. The sliding bearing according to the invention thus has overall an improved durability or fatigue strength.

Preferred proportions of the individual alloy components are indicated herein. It could be observed within the scope of tests of a sliding bearing according to the invention that in silver alloys with the maximum proportions of individual alloy components characterised in more detail in the claims, a further improvement in the wearing properties can be achieved. Said details are defined as ranges from 0 wt. % to the respective maximum proportion of the metals.

To optimize the wearing resistance further in the silver-based alloy of the functional layer at least one hardness phase and/or particles can be incorporated, which can be both metallic and also non-metallic and/or at least one type of soft particle or soft phases.

For a better understanding of the invention the latter is explained in more detail with reference to the following Figures.

In a much simplified representation:

FIG. 1 shows a side view of a two-layer sliding bearing in the form of a sliding bearing half shell;

FIG. 2 to FIG. 5 show respectively a cut-out of embodiment variants of the layer structure of sliding bearings;

FIG. 6 shows a cut-out of a connecting rod in the region of the connecting rod eye in side view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIGS. 1 to 6 show different layer structures for sliding bearings 1. Each of said sliding bearings 1 comprises a support element 2, on which a functional layer 3 according to the invention is applied, possibly with the arrangement of intermediate layers.

Thus the sliding bearing 1 according to FIG. 1 is designed as a so-called double-layer bearing in the form of a sliding bearing half shell. In this case the functional layer 3 is joined directly to the support element 2 and forms a sliding layer 4.

The layer structure of the sliding bearing 1 according to FIG. 2 comprises between the support element 2 and the functional layer 3 designed as a sliding layer 4 a so-called bearing metal layer 5 as an intermediate layer.

The bearing metal layer 5 can consist in principle of the usual bearing metals for such sliding bearings 1 known from the prior art, for example aluminium or copper-based alloys.

In the embodiment variant of the sliding bearing 1 according to FIG. 3 the functional layer 3 is connected in turn directly to the support element 2, however said functional layer 3 is arranged on the rear side, i.e. a bearing back 6, of the sliding bearing 1, i.e. not as in the embodiment variants according to FIG. 1 or 2, facing a component to be supported. Said functional layer 3 according to FIG. 3 forms for example a so-called anti-fretting layer 7, in order to protect the sliding bearing 1 more effectively from corrosion and/or frictional welding, or a mounting auxiliary layer.

FIG. 4 shows an embodiment variant of the layer structure of the sliding bearing 1, in which the functional layer 3 as a bonding layer 8 is located between the support element 2 and the bearing metal layer 5. On the bearing metal layer 5 a sliding layer 9 is arranged, which is different from the aforementioned sliding layer 4 (FIG. 1). The functional layer 3 as an intermediate layer can have the function of a so-called diffusion barrier layer 10.

In contrast to this in the embodiment variant according to FIG. 5 the functional layer 3 is arranged between the bearing metal layer 5 and the sliding layer 9, in order to function as a bonding layer 8 and/or diffusion barrier layer 10.

In the embodiments according to FIGS. 4 and 5 the bearing metal layer 5 can be formed by alloys known from the prior art, similarly the sliding layers 9 are made from conventional materials, which are known for these purposes from the prior art. Examples of this are aluminium, copper, indium, bismuth, tin or lead and the alloys thereof with a greater proportion of soft phases, hard sputtered layers and sliding layers 9 made from sliding lubricating coatings.

Lastly FIG. 6 shows an embodiment variant of the invention, in which the functional layer 3 is also joined directly to the support element 2, whereby in this case the support element 2 does not form a separate sliding bearing half-shell, but a connecting rod 11 and in this case a connecting rod eye 12 is coated directly with the functional layer 3.

For completeness it should be mentioned that bonding layers 8 are known for improving the adhesiveness of the layer composite and diffusion barrier layers 10 are used to avoid the diffusion of individual components of one layer into another layer.

Said embodiment variants of the layer structures according to FIGS. 1 to 6 represent only some examples of possible embodiment variants possible within the scope of the invention. Of course, other embodiments with more than the shown amount of layers are possible, in which for example such a sliding bearing 1 comprises both the support element 2, the bearing metal layer 5, the sliding layer 4 or 9, and between the individual layers bonding and/or diffusion barrier layers (8, 10) and if necessary on the rear side of the bearing comprises the anti-fretting layer 7t. The functional layer 3 can also be designed in multiple-layer bearings as a sliding layer 4 and/or bearing metal layer 5 and/or bonding or diffusion barrier layer (8, 10), as a layer on the rear of the sliding bearing 1, etc.

Also designs of sliding bearings are possible in which more than one layer is formed by the functional layer 3, for example the sliding layer 4 and the bearing metal layer 5 and if necessary the bonding layer 8 and/or the diffusion barrier layer 10, although in these variants of the invention said layers normally have a different composition.

In general it is noted that sliding bearings 1 within the meaning of the invention are defined not only as the shown embodiment variants but generally as bearings which are subjected to a tribological stress and which support an additional component rotatably. Examples of this are the aforementioned sliding bearing half-shells, as well as piston bolts, bearing pins, connecting rod eyes, bearing bushes, run-on rings etc., whereby said sliding bearings 1 can be both separate components or can also be produced by direct coating, as can be seen in the case of FIG. 6.

According to the invention the functional layer 3 is made from a silver-based alloy, wherein silver forms the main component of the alloy, that is it is in the highest proportion with regard to the composition of the alloy. In addition to silver the silver-based alloy comprises at least one element from a group comprising gallium, manganese, nickel, copper, zinc, germanium, indium, tin, antimony and aluminium, wherein the total content of said additional alloy elements is between 0.01 wt. % and 70 wt. %. In binary alloys the proportion of silver is at least 51 wt. %. Furthermore, the proportion of indium is generally a maximum of 10 wt. % in binary silver-based alloys according to the invention, the proportion of tin or copper in the embodiment of the functional layer as a sliding layer 5 is a maximum of 10 wt. % or 14 wt. %.

In preferred embodiment variants the proportion of gallium is a maximum of 15 wt. % and/or the proportion of manganese is a maximum of 35 wt. % and/or the proportion of nickel is a maximum of 8 wt. % and/or the proportion of zinc is a maximum of 40 wt. % and/or the proportion of germanium is a maximum of 15 wt. % and/or the proportion of indium is a maximum of 35 wt. % and/or the proportion of antimony is a maximum of 25 wt. % and/or the proportion of aluminium is a maximum of 15 wt. %.

Said preferred proportions are based on the fact that although economies can be made with higher proportions, above the limit of the indicated proportions in some circumstances phases occur which are more difficult to shape. For example, tin in higher amounts can also form hard phases, whereby the adaptability of the sliding bearing 1 may be reduced owing to reduced ductility. In particular, with higher proportions of gallium and indium the latter can also appear as a separate phase, whereby the temperature loadability drops. Furthermore, it could be observed that with higher proportions of alloy elements in certain circumstances the positive properties of the silver alloy, namely the low affinity to steel or iron, are partly lost. In some circumstances silver alloys with greater proportions of alloy elements also exhibit an increased tendency to corrosion.

It should be noted that the indicated limit values are defined in a range from 0 wt. % to the respective range limit.

With reference to the data from the test results with sliding bearings 1 according to the invention it was established that it is advantageous if the proportion of gallium is between 2 wt. % and 8 wt. % and/or the proportion of manganese is between 5 wt. % and 15 wt. % and/or the proportion of nickel is between 1 wt. % and 2 wt. % and/or the proportion of copper is between 1 wt. % and 5 wt. % and/or the proportion of zinc is between 10 wt. % and 30 wt. % and/or the proportion of germanium is between 1 wt. % and 5 wt. % and/or the proportion of indium is between 5 wt. % and 20 wt. % and/or the proportion of tin is between 2 wt. % and 10 wt. % and/or the proportion of antimony is between 3 wt. % and 15 wt. % and/or the proportion of aluminium is between 2 wt. % and 5 wt. %.

In addition to the already mentioned binary alloys it is possible within the scope of the invention to produce the functional layer 3 from multicomponent alloys, thus for example ternary or quaternary alloys, or it is also possible to alloy together more than four metals, for example five, six, seven, eight or more.

Depending on the additional alloy element used the hardening is performed by depositing silver mixed crystals with the respective metal or in the form of X-ray amorphous silver alloys or by deposit(s) into the mixed crystals of hardened silver mixed crystals or by intermetallic phases of the silver with the alloy element or alloy elements.

For test purposes within the scope of the invention the following compositions were produced for the functional layer 3, whereby the figures in table 1 are defined in wt. %. The remainder up to 100 wt. % is formed by silver. Of course, all of the metals used may contain impurities depending on the degree of purity or manufacturing process. The hardness was measured according to Vickers with a test force of 10 kilopond (kp) or in the case of thin layers by way of the Vickers microhardness test with a test force of 10 pond.

TABLE 1

| No. | Ga | Mn | Ni | Cu | Zn | Ge | In | Sn | Sb | Al | Hardness |
|---|---|---|---|---|---|---|---|---|---|---|---|
| 1 | 30 | | | | | | | | | | 92 |
| 2 | | 15 | | | | | | | | | 87 |
| 3 | | | | 45 | | | | | | | 120 |
| 4 | | | | 30 | | | | | | | 108 |
| 5 | | | | 15 | | | | | | | 93 |
| 6 | 13 | | | | | | | | | | 75 |
| 7 | 8 | | | | | | | | | | 88 |
| 8 | 3 | | | | | | | | | | 90 |
| 9 | | | 5 | | | | | | | | 112 |
| 10 | | | 2 | | | | | | | | 98 |
| 11 | | | | | 14 | | | | | | 115 |
| 12 | | | | | 10 | | | | | | 95 |
| 13 | | | | | 5 | | | | | | 88 |
| 14 | | | | | | 15 | | | | | 91 |
| 15 | | | | | | 10 | | | | | 85 |
| 16 | | | | | | 4 | | | | | 81 |
| 17 | | | | | | | 10 | | | | 80 |
| 18 | | | | | | | 8 | | | | 92 |
| 19 | | | | | | | 4 | | | | 110 |
| 20 | | | | | | | | 10 | | | 84 |
| 21 | | | | | | | | 8 | | | 82 |
| 22 | | | | | | | | 5 | | | 79 |
| 23 | | | | | | | | | 20 | | 83 |
| 24 | | | | | | | | | 12 | | 80 |
| 25 | | | | | | | | | 8 | | 79 |
| 26 | | | | | | | | | 22 | | 83 |
| 27 | | | | | | | | | 15 | | 81 |
| 28 | | | | | | | | | 3 | | 78 |
| 29 | | | | | | | | | | 18 | 90 |
| 30 | | | | | | | | | | 8 | 87 |
| 31 | | | | | | | | | | 5 | 83 |
| 32 | | 8 | | | 25 | | | | | | 121 |
| 33 | 1 | 5 | | | 10 | | | 8 | | | 118 |
| 34 | | 12 | 4 | | | | | | | | 105 |
| 35 | | 15 | | | 35 | | | 20 | | | 135 |
| 36 | 2 | | 3 | 6 | | 1 | 5 | | | | 108 |
| 37 | | | | | 22 | | | | 8 | | 111 |
| 38 | | 4 | | 4 | | | | | | | 93 |
| 39 | | 10 | | | 30 | | | | | | 101 |
| 40 | 1 | 8 | | | 25 | | | | | | 99 |
| 41 | | 5 | | | 5 | | | | 25 | | 88 |
| 42 | | | 10 | | 5 | | 2 | | 3 | | 101 |
| 43 | 5 | 10 | | 2 | 15 | | | 20 | | | 112 |
| 44 | | 5 | 4 | 3 | | | | | 10 | | 101 |
| 45 | | 5 | | | | | | | | | 87 |
| 46 | | | | | 10 | | | | | | 88 |
| 47 | | | | | 3 | | | | | | 80 |
| 48 | | | | 1 | | | | 2 | | | 78 |
| 49 | | | | | | | | 3 | 4 | | 80 |
| 50 | | | 1 | | | | | | | | 80 |
| 51 | | | | | | 1 | | | | | 81 |
| 52 | | | | 4 | | | | | | | 84 |
| 53 | 1 | | | | | | | | 8 | | 79 |
| 54 | | | | | | | | | | 4 | 75 |
| 55 | | | | | | | | | 8 | | 77 |
| 56 | | | | | 10 | | | | | | 91 |
| 57 | | 5 | | | | | | | | | 89 |
| 58 | | | | | | 2 | | | | | 85 |

Examples 1 to 38 represent in this case the embodiments of the functional layer 3 as a sliding layer 4, examples 39 to 44 show embodiments of the function layer 3 as a bearing metal layer 5, examples 45 to 46 show embodiments of the functional layer 3 as a bonding layer 8, examples 47 to 51 show embodiments of the function layer 3 as a diffusion barrier layer 10 and examples 52 to 58 show embodiments of the functional layer 3 as an antifretting layer 7.

Generally, it should be noted, that the hardness can drop by soft-annealing by up to 20%. By means of galvanic, for example cyanide, deposition or PVD-deposition (gas phase deposition) of the layers the hardness can be increased by up to 50%.

The resistance to corrosion was determined by an oil heating test at a temperature of 160° C. and a heating time of 50 h. The corrosion layer was defined as $Ag_2S$. Pure silver had a thickness of the corrosion layer of about 5 μm. By means of the alloys according to the invention said layer thickness could be reduced by 1 μm to 2.5 μm.

Examples of the functional layers 3 according to the invention are AgZn15, AgMn10, AgAl6, or the like.

To further improve the matrix or the silver alloys it is possible to alloy the latter with additional metals to form hard phases. In particular, at least one element from an additional element group comprising chromium, iron, cobalt, molybdenum, tungsten, is added as an alloy in a proportion of between 0.1 vol.-% and 30 vol.-%, in particular in a proportion of 2 vol.-% to 10 vol.-%, in relation to the entire alloy. Also non-metallic particles, such as for example metal nitrides, metal carbides, metal oxides, etc., can be alloyed in a proportion of 0.1 vol.-% and 30 vol.-%, in particular in a proportion of 2 vol.-% to 10 vol.-%, of the respective silver-based alloy. Examples of this can be seen from table 2, whereby the indicated figures are defined in vol.-% respectively in relation to the whole silver-based alloy. The alloy number in column 1 refers in this case to the respective composition from table 1.

In general, it was established that by means of this additive an additional increase in hardness of said silver-based alloys of up to 20% can be achieved, so that the resilience of such a sliding bearing 1 is much improved or that with at least almost equal hardness of the alloys the wearing resistance is improved.

It should be noted at this point that although no mixtures of hard phases are indicated, it is of course possible to use several different hard phases.

It is also noted that examples 1 to 38 from table 2 relate to the design of the functional layer 3 as a sliding layer 4.

By means of said hard phase formers or hard phases it is also possible to use silver-based alloys for sliding bearings 1 according to the invention, in which the elements of the first element group do not form mixed crystals with silver or are added in a proportion where no mixed crystal formation occurs.

The used particles can in this case have an average particle size of between 10 nm and 100 μm, in particular between 50 nm and 10 μm, whereby also embodiments are possible with two different particle size fractions, e.g. a first particle fraction comprises particles with an average particle size of 10 μm to 30 μm and a second particle fraction comprises particles with an average particle size of between 60 μm and 90 μm.

If necessary, fibres can also be inserted in the silver matrix, in particular inorganic fibres, such as e.g. glass, carbon, for example carbon nanotubes, whiskers, metal fibres, for example made of Cu or steel, as well as mixtures thereof, in order to improve the hardness or the sliding behaviour of the layers.

It is also possible to add amorphous carbon to the silver alloys in a proportion selected from a range with a lower limit of 0.01 wt. % and an upper limit of 5 wt. %, in particular from a range with a lower limit of 0.1 wt. % and an upper limit of 1 wt. %.

It is also possible to add small amounts of grain refiners, e.g. zirconium, scandium, titanium or boron to the silver alloys. For example, the alloys can comprise proportions of between 0.01 wt. % and 5 wt. % of said elements, wherein here again mixtures of said elements are possible. Titanium and boron can however also function as hard phase formers.

To increase the embedding ability of the functional layer 3 for foreign particles from abrasion or to improve the anti-locking properties or achieve a reduced tendency to corrosion and improved adaptability to the component to be supported, also soft particles or soft phases can be included in a proportion between 0.1 vol.-% and 30 vol.-%, in particular in a proportion between 2 vol.-% and 20 vol.-%, or in a proportion between 2 vol.-% and 10 vol.-%, selected from a soft phase group comprising lead, bismuth, tin, indium, polymer particles, such as e.g. PTFE, PA, PAI, etc., with the proviso that the alloyed element from the group gallium, manganese, nickel, copper, zinc, germanium, indium, tin, antimony and aluminium is not the same as the element or element(s) of the soft phase group. Examples of this are also given in table 2, wherein the figures are defined in vol.-% and the consecutive number relates to the composition corresponding to table 1. With regard to carbon in table 2 amorphous carbon is used and the amounts are given in wt. %.

TABLE 2

| No. | WC | $CrO_3$ | $Al_2O_3$ | SiC | $Si_3N_4$ | $SiO_2$ | C | Pb | Bi | Sn | In |
|---|---|---|---|---|---|---|---|---|---|---|---|
| 1 | | | | | | | 2.5 | | | | |
| 2 | | | | | 8 | | | | | | 8 |
| 3 | | | | | | | | 5 | | | |
| 4 | | | | | | 1 | | | | | |
| 5 | | | | | 2 | | | | | | 5 |
| 6 | | | | 6 | | | | | | | |
| 7 | 10 | | | | | | | | | | |
| 8 | | | | | | 22 | | | | | |
| 9 | | 2 | | | | | | | | | |
| 10 | | | 2 | | | | | | | | |
| 11 | | | | | | | 1 | | | | |
| 12 | | | | | | 10 | | | | | |
| 13 | | | | | | | | | | 18 | |
| 14 | | | | | | | | | | 5 | |
| 15 | | | | | | | | 5 | | | |
| 16 | | | | | | 8 | | | | | |
| 17 | 20 | | | | | | | | | | |
| 18 | | | | | 15 | | | | | | |
| 19 | | | | | 4 | | | | | | |
| 20 | | 4 | | | | | | | | 17 | |
| 21 | 15 | | | | | | | | 6 | | |
| 22 | 25 | | | | | | | | | | |
| 23 | | | 6 | | | | | | | | |
| 24 | | | | 6 | | | | | | | |
| 25 | | | | | 6 | | | | | | |

TABLE 2-continued

| No. | WC | CrO₃ | Al₂O₃ | SiC | Si₃N₄ | SiO₂ | C | Pb | Bi | Sn | In |
|---|---|---|---|---|---|---|---|---|---|---|---|
| 26 | | | | | | 2 | | | | | |
| 27 | | | | | | 1 | | | | | |
| 28 | | | | | 4 | | | | | | |
| 29 | | 10 | | | | | | | | | |
| 30 | | | | 5 | | | | | | | |
| 31 | | | | | | | 6 | | | | |
| 32 | 2 | | | | | | | | | | |
| 33 | | 2 | | | | | | | | | |
| 34 | | | 2 | | | | | | | | |
| 35 | | | | | 2 | | | | | | |
| 36 | | | | | 4 | | | | | | |
| 37 | | | | | | | | 7 | | 8 | |
| 38 | | | | | | | | | 17 | | |

The thickness of the functional layer 3 can be between 1 μm and 1 mm, depending on which function the functional layer 3 according to the invention is to perform. For example, the layer thickness for intermediate layers in the form of bonding layers 8 or diffusion barrier layers 10 or for anti-fretting layers 7 is between 1 μm and 5 μm. In the embodiment of the functional layer 3 as a sliding layer 4 the layer thickness is between 5 μm and 100 μm, preferably between 10 μm and 30 μm. For direct coatings or as a bearing metal layer 5 layer thicknesses of up to 1 mm are used.

It is also possible within the scope of the invention, in the embodiment of the functional layer 3 as a sliding layer 4, to apply one or more soft inlet layers on the latter, for example made of indium, bismuth, tin or lead as well as alloys thereof. Such an inlet layer can have a layer thickness of between 1 μm and 20 μm, in particular between 3 μm and 10 μm.

The functional layer 3 according to the invention can be produced or applied by conventional methods known from the prior art. For example, the individual metals, possibly as prealloys, can be processing by melt-metallurgy by pouring on or by roll bonding. It is also possible to deposit the function layer 3 by means of a sputtering method or by means of a galvanic method. For the latter depositing method metals are used in the form of salts, such as for example silver as $KAg(CN)_2$ or as methanesulphonate (MSA), as known from the prior art and in particular processes an alkaline or sulphuric acid solution. Sintering methods can also be applied for the production of the functional layer 3. In particular, by means of a sputtering method very fine-grained alloys can be produced.

It is also possible within the scope of the invention to form a concentration gradient of at least one alloy element within the functional layer 3.

Also reverse concentration gradients are possible within the scope of the invention, i.e. in that the increase in the proportion of the respective element runs from the sliding surface in the direction of the internal bearing.

The composition of the functional layer 3 can not only be adapted to the arrangement of said functional layer 3 in the composite layer but also to the additional layers of the sliding bearing 1. For example, in the embodiment of the functional layer 3 as a bearing metal layer 5 the latter can have a greater hardness than the sliding layer 9 arranged thereon. However, also reverse hardness behaviour of the layer structure is possible, as also known from the prior art, such that thus the functional layer 3 as the bearing metal layer 5 is softer than the sliding layer 9.

Finally, as a point of formality, it should be noted that for a better understanding of the structure of the layer the latter and its components have not been represented true to scale in part and/or have been enlarged and/or reduced in size.

LIST OF REFERENCE NUMERALS

1 Sliding bearing
2 Support element
3 Functional layer
4 Sliding layer
5 Bearing metal layer
6 Bearing back
7 Anti-fretting layer
8 Bonding layer
9 Sliding layer
10 Diffusion barrier layer
11 Connecting rod
12 Connecting rod eye
13
14
15

The invention claimed is:
1. Sliding bearing comprising
a support element and
at least one additional functional layer arranged on the support element, said at least one additional functional layer consisting of a silver-based alloy with silver as the main alloy component,
wherein the functional layer in addition to silver consists of at least one element from a group consisting of gallium, manganese, nickel, copper, zinc, germanium, tin, antimony, and aluminum, wherein the total content of said at least one element is between 0.01 wt. % and 70 wt. % and the remainder is silver which includes impurities from the production process, and wherein the proportion of zinc is between 10 wt. % and 30 wt. %, with the proviso that in binary silver-based alloys the proportion of each of the elements gallium, manganese, nickel, germanium, and antimony is a maximum of 49 wt. %, the proportion of tin in the formation of the functional layer as a sliding layer is a maximum of 10 wt. % and the proportion of copper in the formation of the functional layer as a sliding layer is between 1 wt. % and 5 wt. %.

2. Sliding bearing according to claim 1, wherein the proportion of gallium is a maximum of 15 wt. %.

3. Sliding bearing according to claim 1, wherein the proportion of manganese is a maximum of 35 wt. %.

4. Sliding bearing according to claim 1, wherein the proportion of nickel is a maximum of 8 wt. %.

5. Sliding bearing according to claim 1, wherein the proportion of germanium is a maximum of 15 wt. %.

6. Sliding bearing according to claim 1, wherein the proportion of antimony is a maximum of 25 wt. %.

7. Sliding bearing according to claim 1, wherein the proportion of aluminum is a maximum of 15 wt. %.

8. Sliding bearing comprising
a support element and
at least one additional functional layer arranged on the support element, said at least one additional functional layer consisting of a silver-based alloy with silver as the main alloy component,
wherein the functional layer in addition to silver consists of at least one first element and at least one hard-phase forming element, wherein said at least one first element is selected from a group consisting of gallium, manganese, nickel, copper, zinc, germanium, tin, antimony, and aluminum, wherein the total content of said at least one first element is between 0.01 wt. % and 70 wt. %, wherein besides the at least one first element and the at least one hard-phase forming element the remainder of the functional layer is silver which includes impurities from the production process, and wherein the proportion of zinc is between 10 wt. % and 30 wt. %, with the proviso that in binary silver-based alloys the proportion of each of the elements gallium, manganese, nickel, germanium, and antimony is a maximum of 49 wt. %, the proportion of tin in the formation of the functional layer as a sliding layer is a maximum of 10 wt. % and the proportion of copper in the formation of the functional layer as a sliding layer is a maximum of 14 wt. %, wherein the at least one hard-phase forming element is selected from a group consisting of chromium, iron, cobalt, molybdenum, tungsten, titanium, and boron in a proportion of between 0.1 vol.-% and 30 vol.-%.

9. Sliding bearing comprising
a support element and
at least one additional functional layer arranged on the support element, said at least one additional functional layer consisting of a silver-based alloy with silver as the main alloy component,
wherein the functional layer in addition to silver and soft particles or soft phases consists of at least one first element and at least one hard-phase element, wherein said at least one first element is selected from a group consisting of gallium, manganese, nickel, copper, zinc, germanium, tin, antimony, and aluminum, wherein the total content of said at least one first element is between 0.1 wt. % and 70 wt. %, wherein besides the soft particles or the soft phases, the at least one first element, and the at least one hard-phase forming element the remainder of the functional layer is silver which includes impurities from the production process, and wherein the proportion of zinc is between 10 wt. % and 30 wt. %, with the proviso that in binary silver-based alloys the proportion of each of the elements gallium, manganese, nickel, germanium, and antimony is a maximum of 49 wt. %, the proportion of tin in the formation of the functional layer as a sliding layer is a maximum of 10 wt. % and the proportion of copper in the formation of the functional layer as a sliding layer is a maximum of 14 wt. %, wherein the at least one hard-phase forming element is selected from a further element group consisting of chromium, iron, cobalt, molybdenum, tungsten, titanium, and boron in a proportion of between 0.1 vol.-% and 30 vol.-%, and wherein the soft particles or soft phases are in a proportion of between 0.1 vol.-% and 30 vol.-% and are selected from a soft phase group consisting of lead, bismuth, tin, and polymer particles, with the proviso that the at least one first element is not the same as the element or element(s) of the soft particles or the soft phases so that when the soft particles or the soft phases include tin, tin is not present as the at least one first element.

10. Sliding bearing according to claim 1, wherein between the functional layer and the support element or on top of the functional layer at least one additional layer is arranged.

11. Sliding bearing according to claim 8, wherein between the functional layer and the support element or on top of the functional layer at least one additional layer is arranged.

12. Sliding bearing according to claim 9, wherein between the functional layer and the support element or on top of the functional layer at least one additional layer is arranged.

13. Sliding bearing according to claim 8, wherein the at least one hard-phase forming element has a greater hardness than silver.

* * * * *